N. GRATZ.
CUSHION TIRED WHEEL.
APPLICATION FILED FEB. 6, 1912.
1,056,167.
Patented Mar. 18, 1913.
2 SHEETS—SHEET 1.
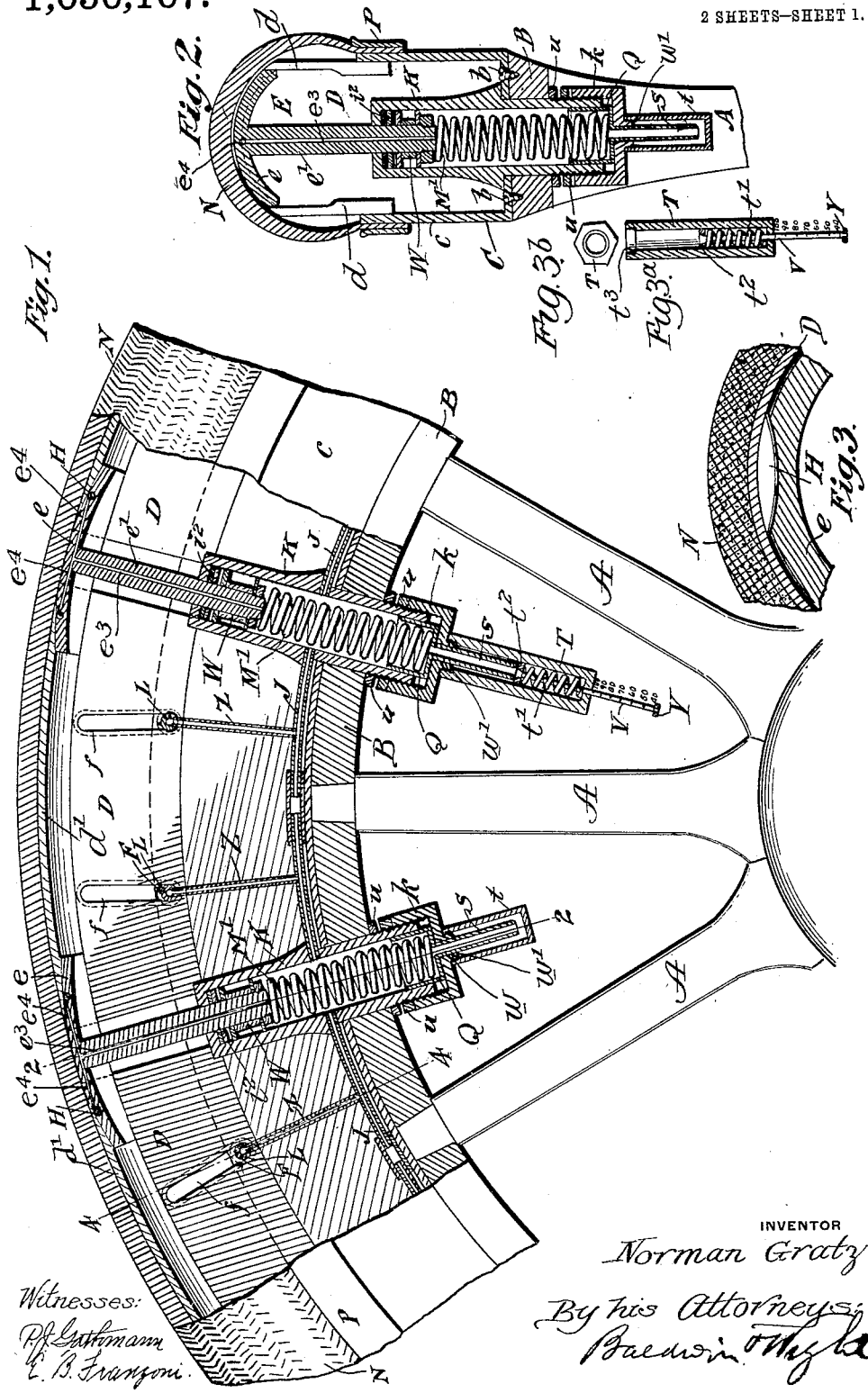
INVENTOR
Norman Gratz
By his Attorneys N. GRATZ.
CUSHION TIRED WHEEL.
APPLICATION FILED FEB. 6, 1912.
1,056,167.
Patented Mar. 18, 1913.
2 SHEETS—SHEET 2.
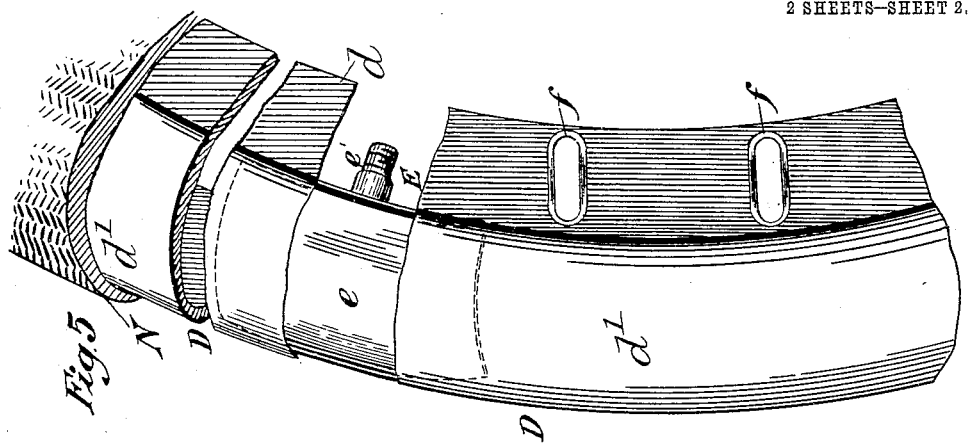
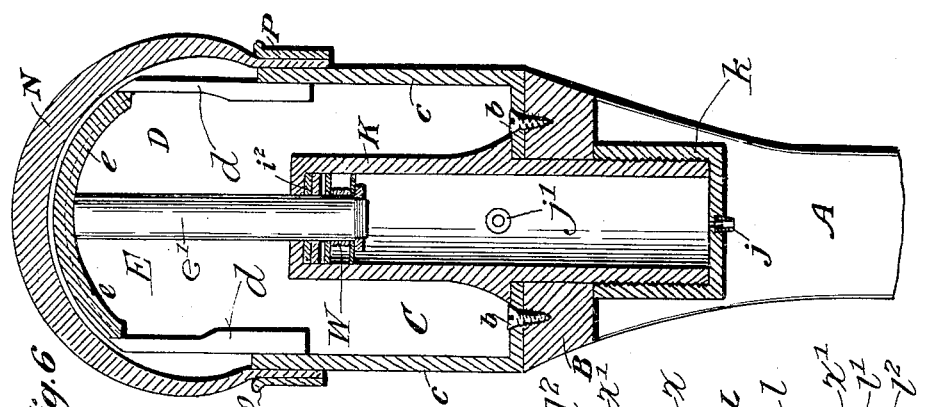
INVENTOR
Norman Gratz.
By his Attorneys

UNITED STATES PATENT OFFICE.

NORMAN GRATZ, OF BOISE, IDAHO.

CUSHION-TIRED WHEEL.

1,056,167.  Specification of Letters Patent.  Patented Mar. 18, 1913.

Application filed February 6, 1912. Serial No. 675,747.

*To all whom it may concern:*

Be it known that I, NORMAN GRATZ, a citizen of the United States, residing at Boise, in the county of Ada and State of Idaho, have invented certain new and useful Improvements in Cushion-Tired Wheels, of which the following is a specification.

My invention relates to wheels of the class in which provision is made for absorbing shocks or vibrations and increasing the traction of the wheel by means of a tire which is constructed to yield radially as the wheel rotates. Wheels with pneumatic tires are now almost universally used for this purpose, but such tires when punctured or slightly ruptured are rendered inoperative and furthermore are very expensive.

The object of my invention is to provide wheels of this class with novel means for absorbing shocks or vibrations and increasing the traction which are comparatively inexpensive and which are not rendered inoperative by puncture or rupture of the tread portion of the tire.

According to my invention, I make the hub, spokes and felly of the wheel of the usual construction, and I attach to the felly a trough-shaped rim (which I call the inner rim) which serves as a guide for an outer rim made in segmental sections which are separated from each other, their ends overlapping and being supported by radially movable plungers which are normally pressed outward yieldingly but which are capable of moving radially inward to allow the outer rim sections to move inward to absorb whatever shocks or vibrations may be encountered. In order to insure the easy movement of the rim sections I interpose anti-friction rollers between the heads of the plungers and the overlapping ends of the rim sections which sections have inwardly extending flanges which are overlapped by the flanges of the inner rim. The flanges of the outer rim sections are formed with radial slots having beveled walls and through these slots extend bars attached to the inner rim and carrying tapered rollers operating in the beveled slots. In order to exclude dirt, water, etc., and to provide a suitable tread, I employ a cover preferably made of rubber and canvas or similar material which incloses the rim sections and is attached to the outer faces of the radial flanges of the inner rim. The plungers hereinbefore referred to operate in cylinders which preferably contain springs and are also supplied with oil which renders the action of the springs more easy and prolongs their life. In order to lubricate the roller bearings oil conduits are provided which connect said bearings with the oil-containing cylinders. I also provide means whereby the tension of the springs may be tested and regulated in order to obtain uniform pressure throughout the tire.

Other features of my invention and the details of construction will be hereinafter described, and the subject matter deemed novel will be set forth in the claims.

In the accompanying drawings:—Figure 1 is a sectional view of a portion of a vehicle wheel with my improvements applied. Fig. 2 shows a section on the line 2—2 of Fig. 1. Fig. 3 is a detail view in section, showing the roller bearing between one of the plungers and an overlapping outer rim section. Fig. 3$^a$ is a detail view in section of the device employed for testing the pressure of the springs. Fig. 3$^b$ is an end view thereof. Fig. 4 shows a section on the line 4—4 of Fig. 1 but on an enlarged scale. Fig. 5 is a perspective view with parts in section and with parts broken away, showing the relation of some of the parts of the tire. Fig. 6 is a sectional view similar to Fig. 2 but showing a modification. Fig. 7 is a view of one of the cross bars employed, and the rollers, nuts and wearing disks used in connection therewith.

The spokes A are attached as usual at their outer ends to a felly B, and to the periphery of the felly is secured in any suitable way (as by screws $b$) a trough-shaped inner rim C, the radial side flanges $c$ of which serve to confine and guide the radial sides of the outer rim sections. The outer rim is composed of a series of segmental sections D surrounding the inner rim. These sections are separated from each other, and their end portions are beveled and rest upon the outer surfaces of the heads $e$ of the plungers E which are radially arranged and are pressed yieldingly outward either by springs or by air pressure. The rim sections D, as clearly shown in Fig. 5, are U-shape in cross section, the flanges $d$ which are straight and parallel with each other, extend inward while the outer part $d'$ is curved longitudinally and transversely. The opposite ends of the heads $e$ of the plungers extend beneath the flanges $d$ as clearly shown. The flanges $d$ are formed with radial slots $f$ through which extend cross bars L, carrying rollers F. These rollers are tapered from their outer ends inward correspondingly with the bevel or taper of the slots $f$. Each bar L has a middle part $l$, two parts $l'$ of reduced diameter on which the rollers F revolve and two end parts $l^2$ of still smaller diameter which extend through the sides $c$ of the inner rim and through the cover N, and rings P. Such cover N is employed to press the outer rim sections upon the plungers, exclude dust, water, etc., and provide a suitable tread for the wheel. This cover is preferably made of rubber and canvas and is attached to the outer faces of the side flanges $c$ of the inner rim by the rings P, through which the ends $l^2$ of the bars L extend. The openings in the side flanges $c$ of the inner rim are made of about the same diameter as the larger ends of the rollers F and these openings are filled by wearing plates M perforated to receive the ends $l^2$ of the bars which are threaded and receive the nuts $l^3$. In this way the cover N is firmly held in place on the inner rim, and the outer rim sections are guided in their radial movement on easily operating roller bearings. By providing tapered rollers operating in beveled slots any tendency for the sides of the outer rim sections to spread or press outwardly is prevented as the construction shown is such as to cause these parts to tend to move inward toward each other. The bars L also of course limit the radial movement of the outer rim sections and prevent endwise or circumferential movement thereof. By employing tapered rollers operating in tapered slots as shown should the tire tend to twist or move sidewise so as to tend to cause the side flanges $d$ of the outer rim to become inclined and thus bind against the flanges of the inner rim, the tapered rollers will prevent this by a wedging action. In this way undue friction is avoided and free radial movement of the outer rim relatively to the inner one is insured. It will also be observed that when the outer rim creeps or moves slightly circumferentially relatively to the inner rim a wedging action will take place which will hold the flanges $d$ away from the flanges $c$ and thus avoid friction.

In order to provide for the easy movement of the beveled ends of the outer rim sections on the heads $e$ of the plungers, I arrange anti-friction rollers H in the heads of the plungers. These rollers are seated in recesses in the heads $e$ and bear against the beveled overlapping end portions of the outer rim sections. As shown in Fig. 3 the rollers H are tapered properly to conform to the contour of the portions of the rim sections which they engage.

As before stated the plungers E are pressed radially outward yieldingly. This may be accomplished in various ways but I preferably employ spiral springs for this purpose, although compressed air may be employed, in the manner indicated in Fig. 6. As shown in the other figures of the drawings, however, the inwardly extending shank $e'$ of each plunger passes into a cylinder K set radially on the inner rim and extending through this rim and through the felly, being closed at its inner end by a cap $k$. The inner end of the shank $e'$ carries a piston W of suitable construction and the opening in the outer end of the cylinder K is suitably packed, as shown at $i^2$. The inner end of each cylinder is threaded to receive the cap $k$ and also to receive lock nuts $u$ employed to hold the cylinder firmly on the felly and also to lock the cap in place. Each cap is provided with an opening $w$ and with a threaded boss $w'$ surrounding this opening. Each spring M' presses at its outer end against the piston W and at its inner end it extends into a cup Q having a tubular stem S which extends through the opening $w$ and through the hollow boss $w'$ which boss is threaded and receives a cap $t$, by means of which the cap $k$ is tightly closed. The cylinders K are connected by pipes J and by introducing oil into one of the cylinders the lubricant may be supplied to all of the cylinders in the wheel. In this way the springs may be made to operate in oil, thus enabling them to work more easily and to prolong their life, and the pistons of the plungers are also made to work more smoothly. I also find it advantageous to oil the roller bearings which I employ. For this purpose the stems of the plungers are formed with channels $e^3$ which communicate with channels $e^4$ in the heads of the plungers leading to the rollers H. As the plungers move radially oil is forced to the roller bearings and keeps them thoroughly lubricated. Too free movement of the oil may be prevented by restricting in any suitable way the oil conduits. In order to lubricate the rollers F, the bars L are formed with oil passages $x$ extending axially through them. The passage $x$ has lateral branches $x'$ through which the lubricant can pass to the bars, and said passage $x$ in each of the rollers is connected with a radially arranged pipe Z which in turn connects with the pipes J. In this way oil may be delivered to the rollers F, the pressure exerted by the plungers promoting the flow of oil thereto and this flow may be restricted, if necessary, in any suitable way.

In order to test the spring pressure, I provide a device of the kind illustrated in Fig. 3ª. This device comprises a tube T containing a spring $t'$, a piston $t^2$ and a rod V. This rod is provided with a scale and its outer end has a head or knob Y. The inner end of the tube T has a threaded opening $t^3$ which screws on to the threaded boss $w'$ as shown in Fig. 1. When the cap $t$ is removed the tube T may be screwed on to the boss $w'$, the outer end of the stem S bearing against the piston $t^2$. As the spring M' presses radially inward, it is obvious that the rod V will be pressed radially inward to an extent corresponding with the spring pressure, and thus the amount of pressure exerted by the spring may be determined and such pressure may be regulated, either increased or diminished, by turning in the proper direction the cap $k$ and by these devices the pressure of all the springs in the wheel may be made uniform.

In Fig. 6 I have shown a construction in which compressed air may be employed to press the plungers radially outward. In this case the cylinders K may be connected by pipes J, similar to those shown in Fig. 1, which enter the cylinders at $j'$. By means of a pump air may be supplied at $j$ to one of the cylinders and pass from this cylinder to all the others.

I claim as my invention:—

1. A wheel tire, comprising an inner rim, an outer rim composed of segmental sections, radially movable plungers pressed yieldingly outward overlapped by the outer rim and having stems and heads formed with channels for the passage of lubricating material, rollers carried by the outer ends of the plungers and bearing against the overlapping portions of the outer rim, lubricant-containing cylinders connected with the inner rims into which the stems of the plungers extend, and means within the cylinders for pressing the plungers outward.

2. A wheel tire comprising an inner rim having parallel radial flanges, an outer rim composed of segmental sections having parallel inwardly extending side flanges overlapped by the flanges of the inner rim and formed with radial slots the side walls of which are beveled inwardly, means for pressing the outer rim sections yieldingly outward, cross bars extending through the flanges of the inner rim, and also extending through the slots of the outer rim, rollers tapered inwardly and fitting the beveled slots of the outer rim and carried by said cross bars, and means for securing the cross bars to the side flanges of the outer rim.

3. A wheel tire, comprising an inner rim having parallel outwardly extending side flanges having openings formed near their edges, an outer rim composed of segmental sections having inwardly extending side flanges overlapped by the flanges of the inner rim and formed with radial slots, means for pressing the outer rim sections yieldingly outward, wearing plates seated in the openings of the side flanges of the inner rim, cross bars extending through said openings and plates and through the slots of the outer rim flanges, rollers carried by the cross bars and operating in said slots, a cover surrounding the outer rim and overlapping the flanges of the inner rim and devices engaging the outer ends of the cross bars for securing the cover to the inner rim.

4. A wheel tire, comprising an inner rim having radial side flanges, an outer rim composed of segmental sections having inwardly extending side flanges formed with radial slots, means for pressing the outer rim sections outwards yieldingly, channeled cross bars secured to the side flanges of the inner rim and extending through the slots in the side flanges of the outer rim, rollers carried by the cross bars and arranged in said slots, and with which said channels communicate, a lubricant receptacle, and connections between the lubricant receptacle and the channels of the cross bars.

5. A wheel tire, comprising an inner rim having radial side flanges, an outer rim composed of segmental sections having inwardly extending side flanges formed with radial slots, channeled cross bars secured to the flanges of the inner rim and extending through the slots of the flanges of the outer rim, rollers carried by the cross bars and operating in said slots, radially movable plungers pressed yieldingly outward and supporting the outer rim sections, lubricant-containing cylinders secured to the inner rim in which the plungers operate, and connections between said cylinders and the channeled bars by which lubricating material is supplied to said rollers.

In testimony whereof, I have hereunto subscribed my name.

NORMAN GRATZ.

Witnesses:
HERMIE KROEGER,
JOHN RADER.